US008338517B2

(12) United States Patent
Dams et al.

(10) Patent No.: US 8,338,517 B2
(45) Date of Patent: Dec. 25, 2012

(54) AQUEOUS COMPOSITIONS OF FLUORINATED SURFACTANTS AND METHODS OF USING THE SAME

(75) Inventors: Rudolf J. Dams, Antwerp (BE); Michael S. Terrazas, Prescott, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 143 days.

(21) Appl. No.: 12/601,143

(22) PCT Filed: May 21, 2008

(86) PCT No.: PCT/US2008/064307
§ 371 (c)(1),
(2), (4) Date: Nov. 20, 2009

(87) PCT Pub. No.: WO2008/147796
PCT Pub. Date: Dec. 4, 2008

(65) Prior Publication Data
US 2010/0168300 A1  Jul. 1, 2010

Related U.S. Application Data

(60) Provisional application No. 60/939,771, filed on May 23, 2007.

(51) Int. Cl.
*C08K 5/00* (2006.01)
(52) U.S. Cl. ........ 524/284; 524/502; 524/544; 524/545; 526/242; 526/248; 526/250
(58) Field of Classification Search ............... 524/308, 524/284, 502, 544, 545; 526/242, 248, 250
See application file for complete search history.

(56) References Cited

U.S. PATENT DOCUMENTS

| | | |
|---|---|---|
| 2,713,593 A | 7/1955 | Brice et al. |
| 3,250,808 A | 5/1966 | Moore, Jr. et al. |
| 3,271,341 A | 9/1966 | Garrison |
| 3,274,244 A | 9/1966 | Mackenzie |
| 3,306,855 A | 2/1967 | Borecki |
| 3,391,099 A | 7/1968 | Punderson |
| 3,451,908 A | 6/1969 | Sianesi et al. |
| 3,492,374 A | 1/1970 | Le Bleu |
| 3,536,710 A | 10/1970 | Bartlett |
| 3,553,179 A | 1/1971 | Bartlett |
| 3,555,089 A | 1/1971 | Bartlett |
| 3,555,100 A | 1/1971 | Garth et al. |
| 3,589,906 A | 6/1971 | McDowell |
| 3,621,059 A | 11/1971 | Bartlett |
| 3,644,492 A | 2/1972 | Bartlett |
| 3,646,085 A | 2/1972 | Bartlett |
| 3,721,696 A | 3/1973 | Sianesi et al. |
| 3,798,265 A | 3/1974 | Bartlett |
| 3,810,874 A | 5/1974 | Mitsch et al. |
| 3,839,425 A | 10/1974 | Bartlett |
| 3,927,072 A | 12/1975 | Fox |
| 4,025,709 A | 5/1977 | Blaise et al. |
| 4,089,804 A * | 5/1978 | Falk .................. 516/9 |
| 4,292,402 A | 9/1981 | Pollet et al. |
| 4,380,618 A | 4/1983 | Khan et al. |
| 4,381,384 A | 4/1983 | Khan |
| 4,544,458 A | 10/1985 | Grot et al. |
| 4,588,796 A | 5/1986 | Wheland |
| 4,621,116 A | 11/1986 | Morgan |
| 4,766,190 A | 8/1988 | Morita et al. |
| 4,789,717 A | 12/1988 | Giannetti et al. |
| 4,832,879 A | 5/1989 | Hamprecht |
| 4,861,845 A | 8/1989 | Slocum et al. |
| 4,864,006 A | 9/1989 | Giannetti et al. |
| 4,987,254 A | 1/1991 | Schwertfeger et al. |
| 5,130,477 A | 7/1992 | Koike et al. |
| 5,132,446 A | 7/1992 | Tohzuka et al. |
| 5,153,322 A | 10/1992 | Flynn |
| 5,256,318 A | 10/1993 | Masutani et al. |
| 5,285,002 A | 2/1994 | Grootaert |
| 5,350,497 A | 9/1994 | Hung et al. |
| 5,395,657 A | 3/1995 | Strepparola et al. |
| 5,399,718 A | 3/1995 | Costello et al. |
| 5,414,102 A | 5/1995 | Pohmer et al. |
| 5,424,474 A | 6/1995 | Pohmer et al. |
| 5,453,539 A | 9/1995 | Kondo et al. |
| 5,488,142 A | 1/1996 | Fall et al. |

(Continued)

FOREIGN PATENT DOCUMENTS

CA        761007        6/1967

(Continued)

OTHER PUBLICATIONS

Renner, "The long and the short of perfluorinated replacements". Environ. Sci. Technol. 40 (1): 12-3, Jan. 2006.*

(Continued)

*Primary Examiner* — Peter D. Mulcahy
*Assistant Examiner* — Henry Hu

(57) ABSTRACT

Aqueous compositions comprising surfactant represented by a formula selected from the group consisting of:

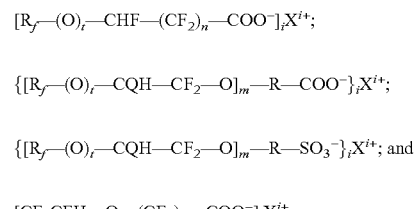

wherein $R_f$ represents a partially or fully fluorinated aliphatic group optionally interrupted with at least one oxygen atom; Q is selected from the group consisting of F and $CF_3$; R is selected from the group consisting of alkylene and arylene; $X^{i+}$ represents a cation having a valence i, wherein i is 1, 2 or 3; t is 0 or 1; m is 1, 2, or 3; n is 0 or 1; and p is an integer from 1 to 6. The aqueous composition comprises a non-fluorinated polymer and is essentially free of fluoropolymers. Methods of coating a surface and an article having a surface in contact with the composition are provided.

14 Claims, No Drawings

U.S. PATENT DOCUMENTS

| | | | |
|---|---|---|---|
| 5,498,680 A | 3/1996 | Abusleme et al. | |
| 5,502,251 A | 3/1996 | Pohmer et al. | |
| 5,532,310 A | 7/1996 | Grenfell et al. | |
| 5,536,425 A | 7/1996 | Kondo | |
| 5,550,277 A | 8/1996 | Paciorek et al. | |
| 5,656,201 A | 8/1997 | Visca et al. | |
| 5,663,255 A | 9/1997 | Anolick et al. | |
| 5,688,884 A | 11/1997 | Baker et al. | |
| 5,710,345 A | 1/1998 | Navarrini et al. | |
| 5,763,552 A | 6/1998 | Feiring et al. | |
| 5,789,508 A | 8/1998 | Baker et al. | |
| 5,959,026 A | 9/1999 | Abusleme et al. | |
| 6,013,712 A | 1/2000 | Chittofrati et al. | |
| 6,013,795 A | 1/2000 | Manzara et al. | |
| 6,025,307 A | 2/2000 | Chittofrati et al. | |
| 6,103,843 A | 8/2000 | Abusleme et al. | |
| 6,127,498 A | 10/2000 | Tonelli et al. | |
| 6,184,187 B1 | 2/2001 | Howell et al. | |
| 6,255,536 B1 | 7/2001 | Worm et al. | |
| 6,297,334 B1 | 10/2001 | Marchese et al. | |
| 6,395,848 B1 | 5/2002 | Morgan et al. | |
| 6,410,626 B1 | 6/2002 | Wada et al. | |
| 6,429,258 B1 | 8/2002 | Morgan et al. | |
| 6,452,038 B1 | 9/2002 | Rao et al. | |
| 6,482,979 B1 | 11/2002 | Hintzer et al. | |
| 6,512,063 B2 | 1/2003 | Tang | |
| 6,576,703 B2 | 6/2003 | Kapeliouchko et al. | |
| 6,602,968 B1 | 8/2003 | Bekiarian et al. | |
| 6,613,860 B1 | 9/2003 | Dams et al. | |
| 6,624,268 B1 | 9/2003 | Maekawa et al. | |
| 6,632,508 B1 | 10/2003 | Pellerite et al. | |
| 6,642,307 B1 | 11/2003 | Sogabe et al. | |
| 6,646,088 B2 | 11/2003 | Fan et al. | |
| 6,656,258 B2 | 12/2003 | Elsbernd et al. | |
| 6,660,798 B1 | 12/2003 | Marchese et al. | |
| 6,664,354 B2 | 12/2003 | Savu et al. | |
| 6,677,414 B2 | 1/2004 | Hintzer et al. | |
| 6,689,854 B2 | 2/2004 | Fan et al. | |
| 6,693,152 B2 | 2/2004 | Kaspar et al. | |
| 6,703,520 B2 | 3/2004 | Hintzer et al. | |
| 6,716,534 B2 | 4/2004 | Moore et al. | |
| 6,730,760 B2 | 5/2004 | Grootaert et al. | |
| 6,737,489 B2 | 5/2004 | Linert et al. | |
| 6,750,304 B2 | 6/2004 | Kaspar et al. | |
| 6,761,964 B2 | 7/2004 | Tannenbaum | |
| 6,774,164 B2 | 8/2004 | Lyons et al. | |
| 6,815,040 B2 | 11/2004 | Pellerite et al. | |
| 6,822,059 B2 | 11/2004 | Buckanin et al. | |
| 6,833,403 B1 * | 12/2004 | Bladel et al. | 524/458 |
| 6,833,418 B2 | 12/2004 | Tan et al. | |
| 6,846,570 B2 | 1/2005 | Leech et al. | |
| 6,878,772 B2 | 4/2005 | Visca et al. | |
| 6,923,921 B2 | 8/2005 | Flynn et al. | |
| 7,041,728 B2 | 5/2006 | Zipplies et al. | |
| 7,045,571 B2 | 5/2006 | Tan et al. | |
| 7,064,170 B2 | 6/2006 | Kaspar et al. | |
| 7,074,862 B2 | 7/2006 | Kaspar et al. | |
| 7,094,829 B2 | 8/2006 | Audenaert et al. | |
| 7,097,910 B2 | 8/2006 | Moore et al. | |
| 7,122,608 B1 | 10/2006 | Brinati et al. | |
| 7,125,941 B2 | 10/2006 | Kaulbach et al. | |
| 7,126,016 B2 | 10/2006 | Fu et al. | |
| 7,141,537 B2 | 11/2006 | Audenaert et al. | |
| 7,214,736 B2 | 5/2007 | Audenaert et al. | |
| 7,279,522 B2 | 10/2007 | Dadalas et al. | |
| 7,297,744 B2 | 11/2007 | Kapeliouchko et al. | |
| 7,342,066 B2 | 3/2008 | Dadalas et al. | |
| 7,351,342 B2 | 4/2008 | Funaki et al. | |
| 7,425,279 B2 | 9/2008 | Coté et al. | |
| 7,462,667 B2 | 12/2008 | Dadalas et al. | |
| 7,566,762 B2 | 7/2009 | Otsuka et al. | |
| 7,659,333 B2 | 2/2010 | Hintzer et al. | |
| 7,671,112 B2 | 3/2010 | Hintzer et al. | |
| 7,678,426 B2 | 3/2010 | Flynn et al. | |
| 7,696,268 B2 | 4/2010 | Tsuda | |
| 7,745,653 B2 | 6/2010 | Iyer et al. | |
| 7,754,795 B2 | 7/2010 | Hintzer et al. | |
| 7,776,946 B2 | 8/2010 | Hintzer et al. | |
| 7,795,375 B2 | 9/2010 | Shirakawa et al. | |
| 7,803,894 B2 | 9/2010 | Dams et al. | |
| 7,838,608 B2 | 11/2010 | Hintzer et al. | |
| 8,002,886 B2 | 8/2011 | Clark | |
| 2002/0091212 A1 | 7/2002 | Abusleme et al. | |
| 2004/0010156 A1 | 1/2004 | Kondo et al. | |
| 2004/0077237 A1 | 4/2004 | Audenaert et al. | |
| 2004/0116742 A1 | 6/2004 | Guerra | |
| 2004/0198880 A1 * | 10/2004 | Ouchi et al. | 524/236 |
| 2004/0242755 A1 | 12/2004 | Araki et al. | |
| 2005/0090613 A1 | 4/2005 | Maruya et al. | |
| 2005/0154104 A1 | 7/2005 | Malvasi et al. | |
| 2005/0228127 A1 | 10/2005 | Tatemoto et al. | |
| 2006/0281946 A1 * | 12/2006 | Morita et al. | 562/586 |
| 2007/0004848 A1 | 1/2007 | Hintzer et al. | |
| 2007/0015865 A1 | 1/2007 | Hintzer et al. | |
| 2007/0117915 A1 | 5/2007 | Funaki et al. | |
| 2007/0155891 A1 | 7/2007 | Tsuda et al. | |
| 2007/0276068 A1 * | 11/2007 | Hintzer et al. | 524/284 |
| 2007/0276103 A1 | 11/2007 | Guerra et al. | |
| 2008/0015304 A1 | 1/2008 | Hintzer et al. | |
| 2008/0015319 A1 | 1/2008 | Hintzer et al. | |
| 2009/0149616 A1 | 6/2009 | Audenaert et al. | |
| 2010/0179262 A1 | 7/2010 | Dams et al. | |
| 2010/0305262 A1 * | 12/2010 | Hintzer et al. | 524/546 |
| 2011/0124532 A1 | 5/2011 | Maurer et al. | |
| 2011/0124782 A1 | 5/2011 | Dams et al. | |

FOREIGN PATENT DOCUMENTS

| | | |
|---|---|---|
| DE | 3 828 063 | 2/1990 |
| EP | 0 525 660 | 2/1993 |
| EP | 0 625 526 A1 | 11/1994 |
| EP | 0 712 882 | 5/1996 |
| GB | 1 194 431 | 6/1970 |
| GB | 1 352 560 | 5/1974 |
| JP | 2002-308914 | 10/2002 |
| JP | 2002-317003 | 10/2002 |
| JP | 2003-027079 | 1/2003 |
| JP | 2003-043625 | 2/2003 |
| JP | 2003-119204 | 4/2003 |
| JP | 2003-212919 | 7/2003 |
| JP | 2004-018394 | 1/2004 |
| JP | 2004-358397 | 12/2004 |
| JP | 2004-359870 | 12/2004 |
| JP | 2007-106958 | 4/2007 |
| WO | WO 98/050603 | 11/1998 |
| WO | WO 02/20676 | 3/2002 |
| WO | WO 2005003075 A1 * | 1/2005 |
| WO | WO 2005/063827 | 7/2005 |
| WO | WO 2005/065800 | 7/2005 |
| WO | WO 2005/092520 | 10/2005 |
| WO | WO 2005/121290 | 12/2005 |
| WO | WO 2005/123646 | 12/2005 |
| WO | WO 2006/014393 | 2/2006 |

OTHER PUBLICATIONS

England, "Catalytic Conversion of Fluoroalkyl Alkyl Ethers to Carbonyl Compounds", J. Org. Chem., 1984, vol. 49, pp. 4007-4008.

Chi et al., "A Facile Synthesis of Partly-fluorinated Ethers Using Perfluroporpoxyethylene and Aliphatic Alcohols", Bull. Korean Chem. Soc., 1999, vol. 20, No. 2, pp. 220-222.

"Synthesis of Perfluoroalkyl Vinyl Ether Acids and Derivatives," Perfluoroalkyl Vinyl Ether Acids. Raymond Sullivan, vol. 34, No. 6, Jun. 1969, p. 1841-1844.

Karsa, "Industrial Applications of Surfactants", The Proceedings of a Symposium organized by the North West Region of the Industrial Division of the Royal Society of Chemistry, The Royal Society of Chemistry, Burlington House, London, 343 pages (1987).

Rosen, "Surfactants and Interfacial Phenomena", John Wiley & Sons, NY, 295 pages (1978).

Tonelli, "Linear Perfluoropolyether Difunctional Oligomers: Chemistry, Properties and Applications", J. Fluorine Chem., 1999, vol. 95, pp. 51-70.

International Search Report, PCT/US2008/064307, dated Aug. 26, 2008, 3 pages.

* cited by examiner

AQUEOUS COMPOSITIONS OF FLUORINATED SURFACTANTS AND METHODS OF USING THE SAME

CROSS REFERENCE TO RELATED APPLICATIONS

This application is a national stage filing under 35 U.S.C. 371 of PCT/US2008/064307, filed May 21, 2008, which claims priority to U.S. Provisional Application No. 60/939,771, filed May 23, 2007, the disclosure of which is incorporated by reference in its entirety herein.

BACKGROUND

Fluorinated surfactants have been widely used in a variety of applications (e.g., coatings, stripping compositions, and emulsion polymerizations) for many years. The addition of a fluorinated surfactant to a formulation (e.g., a coating formulation or stripping formulation) may enhance the properties of the formulation by improving, for example, wetting behavior, leveling properties, and storage stability (e.g., with respect to phase separation). The particular properties affected depend, for example, on the particular composition of each surfactant and the particular formulation.

In coating applications, surfactants that are useful leveling agents lower the surface energy of a formulation and maintain that surface energy at a nearly constant value during drying. However, in general, the ability of a surfactant to lower the surface tension of a solvent or formulation (i.e., the surfactant strength) has little predictive value in determining whether that surfactant will function well as a leveling agent in a coating formulation.

Traditionally, many widely used fluorinated surfactants include long-chain perfluoroalkyl groups, (e.g., perfluorooctyl groups). Recently, however, there has been an industry trend away from using perfluorooctyl fluorinated surfactants, which has resulted in a desire for new types of surfactants which may be used in a variety of applications.

SUMMARY

In one aspect, the present invention provides an aqueous composition comprising a non-fluorinated polymer and a surfactant, wherein the surfactant is represented by a formula selected from the group consisting of:

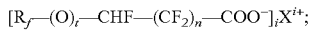

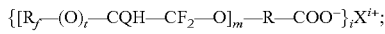

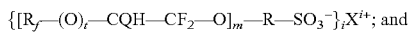

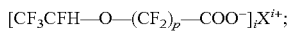

wherein
$R_f$ represents a partially or fully fluorinated aliphatic group optionally interrupted with at least one oxygen atom;
Q is selected from the group consisting of F and $CF_3$;
R is selected from the group consisting of alkylene and arylene;
$X^{i+}$ represents a cation having a valence i, wherein i is 1, 2 or 3;
t is 0 or 1, wherein when the surfactant is represented by formula $[R_f—(O)_t—CHF—(CF_2)_n—COO^-]_iX^{i+}$ and t is 0, then $R_f$ is interrupted with at least one oxygen atom;
m is 1, 2, or 3;
n is 0 or 1; and
p is an integer from 1 to 6; and
wherein the aqueous composition is essentially free of fluoropolymers. In another aspect, the present invention provides a method of coating a surface, the method comprising applying to the surface an aqueous composition according to the present invention.

In another aspect, the present invention provides an article having a surface, wherein at least a portion of the surface is in contact with a composition comprising a non-fluorinated polymer and a surfactant, wherein the surfactant is represented by a formula selected from the group consisting of:

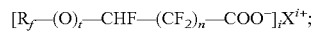

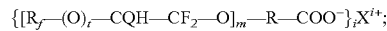

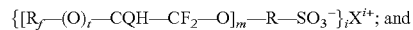

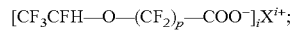

wherein
$R_f$ represents a partially or fully fluorinated aliphatic group optionally interrupted with at least one oxygen atom;
Q is selected from the group consisting of F and $CF_3$;
R is selected from the group consisting of alkylene and arylene;
$X^{i+}$ represents a cation having a valence i, wherein i is 1, 2 or 3;
t is 0 or 1, wherein when the surfactant is represented by formula $[R_f—(O)_t—CHF—(CF_2)_n—COO^-]_iX^{i+}$ and t is 0, then $R_f$ is interrupted with at least one oxygen atom;
m is 1, 2, or 3;
n is 0 or 1; and
p is an integer from 1 to 6; and
wherein the composition is essentially free of fluoropolymers.

In another aspect, the present invention provides an aqueous composition having a pH greater than 11 (in some embodiments, greater than 12 or even 13), the aqueous composition comprising a surfactant represented by a formula selected from the group consisting of:

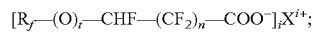

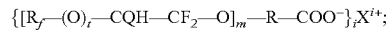

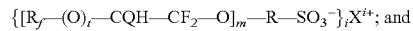

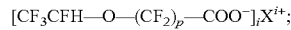

wherein
$R_f$ represents a partially or fully fluorinated aliphatic group optionally interrupted with at least one oxygen atom;
Q is selected from the group consisting of F and $CF_3$;
R is selected from the group consisting of alkylene and arylene;
$X^{i+}$ represents a cation having a valence i, wherein i is 1, 2 or 3;
t is 0 or 1, wherein when the surfactant is represented by formula $[R_f—(O)_t—CHF—(CF_2)_n—COO^-]_iX^{i+}$ and t is 0, then $R_f$ is interrupted with at least one oxygen atom;
m is 1, 2, or 3;
n is 0 or 1; and
p is an integer from 1 to 6.
In some embodiments, the aqueous composition is free of fluoropolymers.

In another aspect, the present invention provides a method of cleaning a surface, the method comprising contacting the surface with an aqueous composition comprising a surfactant represented by a formula selected from the group consisting of:

$$[R_f-(O)_t-CHF-(CF_2)_n-COO^-]_iX^{i+};$$

$$\{[R_f-(O)_t-CQH-CF_2-O]_m-R-COO^-\}_iX^{i+};$$

$$\{[R_f-(O)_t-CQH-CF_2-O]_m-R-SO_3^-\}_iX^{i+}; \text{ and}$$

$$[CF_3CFH-O-(CF_2)_p-COO^-]_iX^{i+};$$

wherein
$R_f$ represents a partially or fully fluorinated aliphatic group optionally interrupted with at least one oxygen atom;
Q is selected from the group consisting of F and $CF_3$;
R is selected from the group consisting of alkylene and arylene;
$X^{i+}$ represents a cation having a valence i, wherein i is 1, 2 or 3;
t is 0 or 1, wherein when the surfactant is represented by formula $[R_f-(O)_t-CHF-(CF_2)_n-COO^-]_iX^{i+}$ and t is 0, then $R_f$ is interrupted with at least one oxygen atom;
m is 1, 2, or 3;
n is 0 or 1; and
p is an integer from 1 to 6.

In some embodiments, cleaning the surface comprises removing a coating from at least a portion of the surface, and wherein contacting the surface comprises contacting the coating. In some embodiments, the aqueous composition has a pH of at least 8 (in some embodiments, at least 9, 10, 11, 12, or 13). In some embodiments, the aqueous composition has a pH in a range from 8 to 10 (in some embodiments, 10 to 13).

In another aspect, the present invention provides a method of reducing the surface tension of a liquid having a pH greater than 11, the method comprising combining the liquid with a surfactant to reduce the surface tension of the liquid, wherein the surfactant is represented by a formula selected from the group consisting of:

$$[R_f-(O)_t-CHF-(CF_2)_n-COO^-]_iX^{i+};$$

$$\{[R_f-(O)_t-CQH-CF_2-O]_m-R-COO^-\}_iX^{i+};$$

$$\{[R_f-(O)_t-CQH-CF_2-O]_m-R-SO_3^-\}_iX^{i+}; \text{ and}$$

$$[CF_3CFH-O-(CF_2)_p-COO^-]_iX^{i+};$$

wherein
$R_f$ represents a partially or fully fluorinated aliphatic group optionally interrupted with at least one oxygen atom;
Q is selected from the group consisting of F and $CF_3$;
R is selected from the group consisting of alkylene and arylene;
$X^{i+}$ represents a cation having a valence i, wherein i is 1, 2 or 3;
t is 0 or 1, wherein when the surfactant is represented by formula $[R_f-(O)_t-CHF-(CF_2)_n-COO^-]_iX^{i+}$ and t is 0, then $R_f$ is interrupted with at least one oxygen atom;
m is 1, 2, or 3;
n is 0 or 1; and
p is an integer from 1 to 6.

In another aspect, the present invention provides an aqueous composition having a pH of at least 8, the aqueous composition comprising a surfactant represented by a formula selected from the group consisting of:

$$[R_f-(O)_t-CHF-(CF_2)_n-COO^-]_iX^{i+};$$

$$\{[R_f-(O)_t-CQH-CF_2-O]_m-R-COO^-\}_iX^{i+};$$

$$\{[R_f-(O)_t-CQH-CF_2-O]_m-R-SO_3^-\}_iX^{i+}; \text{ and}$$

$$[CF_3CFH-O-(CF_2)_p-COO^-]_iX^{i+};$$

wherein
$R_f$ represents a partially or fully fluorinated aliphatic group optionally interrupted with at least one oxygen atom;
Q is selected from the group consisting of F and $CF_3$;
R is selected from the group consisting of alkylene and arylene;
$X^{i+}$ represents a cation having a valence i, wherein i is 1, 2 or 3;
t is 0 or 1, wherein when the surfactant is represented by formula $[R_f-(O)_t-CHF-(CF_2)_n-COO^-]_iX^{i+}$ and t is 0, then $R_f$ is interrupted with at least one oxygen atom;
m is 1, 2, or 3;
n is 0 or 1; and
p is an integer from 1 to 6, and
wherein the aqueous composition is essentially free of fluoropolymers and fluorinated olefins.

In some embodiments of the foregoing aspects, t is 1, and $R_f$ is selected from the group consisting of:
fully fluorinated aliphatic groups having from 1 to 6 carbon atoms; and
fully fluorinated groups represented by formula:

$$R_f^1-[OR_f^2]_x-[OR_f^3]_y-,$$

wherein
$R_f^1$ is a perfluorinated aliphatic group having from 1 to 6 carbon atoms;
$R_f^2$ and $R_f^3$ are each independently perfluorinated alkylene having from 1 to 4 carbon atoms; and
x and y are each independently an integer having a value from 0 to 4,
wherein the sum of x and y is at least 1.

In other embodiments of the foregoing aspects, t is 0, and $R_f$ is a fully fluorinated group represented by formula:

$$R_f^4-[OR_f^5]_a-[OR_f^6]_b-O-CF_2-,$$

wherein
$R_f^4$ is a perfluorinated aliphatic group having from 1 to 6 carbon atoms;
$R_f^5$ and $R_f^6$ are each independently perfluorinated alkylene having from 1 to 4 carbon atoms; and
a and b are each independently integers having a value from 0 to 4.

Surfactants used in some embodiments of the various aspects of the present invention are demonstrated to be useful in harsh environments, for example, by lowering the surface tension in an alkaline formulation containing sodium hydroxide and monoethanolamine. Also, surfactants used in the various aspects of the present invention typically have leveling properties that make them useful as coating additives, for example, in floor finish formulations. In some embodiments, surfactants used in the various aspects of the present invention, which are partially fluorinated surfactants, surprisingly lower the surface tension of water to an extent comparable to fully fluorinated surfactants having a greater number of continuous perfluorinated carbon atoms.

In some of the foregoing aspects, aqueous compositions according to and/or useful in practicing the present invention are essentially free of fluoropolymers. In this application, "essentially free of fluoropolymers" means that the compositions have fluoropolymers in less than 1% (in some embodiments, less than 0.9, 0.8, 0.7, 0.6, 0.5, 0.4, 0.3, 0.2, or 0.1%) by weight, based on the total weight of the aqueous composition. The term "fluoropolymers" includes polytetrafluoroethylene as well as homopolymers or copolymers comprising at least one of the following monomer units: tetrafluoroethylene, chlorotrifluoroethylene, hexafluoropropylene, vinyl fluoride, or vinylidene fluoride.

In some of the foregoing aspects, aqueous compositions according to and/or useful in practicing the present invention are essentially free of fluorinated olefins. In this application, "essentially free of fluorinated olefins" means that the compositions have fluorinated olefins in less than 1% (in some embodiments, less than 0.9, 0.8, 0.7, 0.6, 0.5, 0.4, 0.3, 0.2, or 0.1%) by weight, based on the total weight of the aqueous composition. The term "fluorinated olefins" includes partially and fully fluorinated olefins and includes at least one of tetrafluoroethylene, chlorotrifluoroethylene, hexafluoropropylene, vinyl fluoride, or vinylidene fluoride.

Aqueous compositions according to the present invention comprise water and may optionally further comprise at least one organic solvent. As used herein, the term "solvent" refers to a homogeneous liquid material that is capable of at least partially dissolving the aqueous composition with which it is combined at 25° C.

In this application, all numerical ranges are inclusive of their endpoints unless otherwise stated.

DETAILED DESCRIPTION

Surfactants useful in practicing the present invention are represented by a formula selected from the group consisting of:

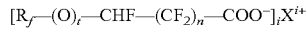   I;

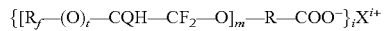   II;

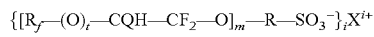   III; and

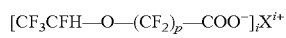   IV.

In some embodiments, surfactants useful in practicing the present invention are represented by a formula selected from the group consisting of Formula I, II, and IV.

In some embodiments, surfactants useful in practicing the present invention have an anion portion with a molecular weight of up to 600 grams per mole (in some embodiments, up to 500, 400, or even up to 300 grams per mole).

In some embodiments, surfactants useful in practicing the present invention have improved renal clearance after being administered to rats than a surfactant having a perfluoroheptyl group; (see, e.g., U.S. Pat. App. No. 2007/0015864 (Hintzer et al.)).

$R_f$ represents a partially or fully florinated aliphatic group optionally interrupted with at least one oxygen atom. $R_f$ includes linear and branched aliphatic groups having from 1 to 10 carbon atoms. In some embodiments, $R_f$ represents fully fluorinated aliphatic group having up to 6 (in some embodiments, 5, 4, 3, 2, or 1) carbon atoms. In some embodiments, $R_f$ is a fully fluorinated aliphatic group interrupted with at least one oxygen atom, of which the aliphatic groups between oxygen atoms have up to 6 (in some embodiments, 5, 4, 3, 2, or 1) carbon atoms, and wherein the terminal aliphatic group has up to 6 (in some embodiments, 5, 4, 3, 2, or 1) carbon atoms. In some embodiments, $R_f$ is a partially fluorinated aliphatic group having up to 6 (in some embodiments, 5, 4, 3, 2, or 1) carbon atoms and up to 2 hydrogen atoms. In some embodiments, $R_f$ is a partially fluorinated aliphatic group having up 2 hydrogen atoms interrupted with at least one oxygen atom, of which the aliphatic groups between oxygen atoms have up to 6 (in some embodiments, 5, 4, 3, 2, or 1) carbon atoms, and wherein the terminal aliphatic group has up to 6 (in some embodiments, 5, 4, 3, 2, or 1) carbon atoms. In some embodiments, $R_f$ is linear.

In some embodiments of Formulas I, II, and III, $R_f$ is represented by formula

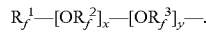

$R_f^1$ is a perfluorinated aliphatic group having from 1 to 6 (in some embodiments, 1 to 4) carbon atoms. $R_f^2$ and $R_f^3$ are each independently perfluorinated alkylene having from 1 to 4 carbon atoms. x and y are each independently an integer having a value from 0 to 4, and the sum of x and y is at least 1.

In some embodiments of Formulas I, II, and III, $R_f$ is represented by formula

$R_f^4$ is a perfluorinated aliphatic group having from 1 to 6 (in some embodiments, 1 to 4) carbon atoms. $R_f^5$ and $R_f^6$ are each independently perfluorinated alkylene having from 1 to 4 carbon atoms. a and b are each independently integers having a value from 0 to 4.

In some embodiments of Formulas I, II, and III, $R_f$ is represented by formula $R_f^7$—$(OCF_2)_p$—, wherein p is an integer of 1 to 6 (in some embodiments, 1 to 4), and $R_f^7$ is selected from the group consisting of a partially fluorinated aliphatic group having 1, 2, 3, 4, 5, or 6 carbon atoms and 1 or 2 hydrogen atoms and fully fluorinated aliphatic group having 1, 2, 3 or 4 carbon atoms.

In some embodiments of Formulas I, II, and III, $R_f$ is represented by formula: $R_f^8$—O—$(CF_2)_q$—, wherein q is an integer of 1 to 6 (in some embodiments, 1 to 4) and $R_f^8$ is selected from the group consisting of partially fluorinated aliphatic groups having 1, 2, 3, 4, 5, or 6 carbon atoms and 1 or 2 hydrogen atoms and fully fluorinated aliphatic groups having 1, 2, 3 or 4 carbon atoms.

In some embodiments of Formulas II and III, Q is F. In other embodiments, Q is $CF_3$.

In Formulas II and III, R is selected from the group consisting of alkylene and arylene. Alkylene includes linear, branched, and cyclic alkylene groups having from 1 to 10 (in some embodiments, 1 to 4) carbon atoms. In some embodiments, R is methylene. In some embodiments, R is ethylene. Arylene includes groups having 1 or 2 aromatic rings, optionally having at least one heteroatom (e.g., N, O, and S) in the ring, and optionally substituted with at least one alkyl group or halogen atom. In some embodiments, R is phenylene.

$X^{i+}$ represents a cation having a valence i, wherein i is 1, 2 or 3. In some embodiments, $X^{i+}$ is $H^+$ (i.e., the carboxylic acid). In some embodiments, $X^{i+}$ is $NH_4^+$ or an organic ammonium salt. In some embodiments, $X^{i+}$ is a cation of an alkali metal (e.g., $Li^+$, $Na^+$, or $K_+$). In some embodiments, $X^{i+}$ is a cation of an alkaline earth metal (e.g., $Ca^{2+}$ or $Mg^{2+}$).

In Formulas I, II, and III, t is 0 or 1. In some embodiments, t is 1. In some embodiments, t is 0. In some embodiments wherein t is 0, $R_f$ is interrupted by at least one oxygen atom.

In Formulas II and III, m is 1, 2, or 3. In some embodiments, m is 1.

In Formula I, n is 0 or 1. In some embodiments, n is 0. In some embodiments, n is 1.

In some embodiments, surfactants useful in practicing the present invention are represented by Formula IV. In Formula IV, p is an integer from 1 to 6. In some embodiments, p is 1, 2, 5, or 6. In some embodiments, p is 3. In some embodiments, p is 1 or 2. In some embodiments, p is 5 or 6. In some embodiments, the surfactant of Formula IV is selected from the group consisting of:

[CF$_3$CFH—O—(CF$_2$)$_3$—COO$^-$]$_i$X$^{i+}$; and

[CF$_3$CFH—O—(CF$_2$)$_5$—COO$^-$]$_i$X$^{i+}$, wherein X$^{i+}$ is as defined above.

In some embodiments, surfactants useful in practicing the present invention are represented by Formula I. In some of these embodiments, the surfactant is selected from the group consisting of:

[C$_3$F$_7$—O—CHF—COO$^-$]$_i$X$^{i+}$;

[CF$_3$—O—CF$_2$CF$_2$—CF$_2$—O—CHF—COO$^-$]$_i$X$^{i+}$;

[CF$_3$CF$_2$CF$_2$—O—CF$_2$CF$_2$—CF$_2$—O—CHF—COO$^-$]$_i$X$^{i+}$;

[CF$_3$—O—CF$_2$—CF$_2$—O—CHF—COO$^-$]$_i$X$^{i+}$;

[CF$_3$—O—CF$_2$—O—CF$_2$—CF$_2$—O—CHF—COO$^-$]$_i$X$^{i+}$;

[CF$_3$—(O—CF$_2$)$_2$—O—CF$_2$—CF$_2$—O—CHF—COO$^-$]$_i$X$^{i+}$; and

[CF$_3$—(O—CF$_2$)$_3$—O—CF$_2$—CF$_2$—O—CHF—COO$^-$]$_i$X$^{i+}$, wherein X$^{i+}$ is as defined above. In other of these embodiments, the surfactant is selected from the group consisting of:

[CF$_3$—O—CHF—CF$_2$—COO$^-$]$_i$X$^{i+}$;

[CF$_3$—O—CF$_2$—CF$_2$—O—CHF—CF$_2$—COO$^-$]$_i$X$^{i+}$;

[CF$_3$—CF$_2$—O—CHF—CF$_2$—COO$^-$]$_i$X$^{i+}$;

[CF$_3$—O—CF$_2$—CF$_2$—CF$_2$—O—CHF—CF$_2$—COO$^-$]$_i$X$^{i+}$;

[CF$_3$—O—CF$_2$—O—CF$_2$—CF$_2$—O—CHF—CF$_2$—COO$^-$]$_i$X$^{i+}$;

[CF$_3$—(O—CF$_2$)$_2$—O—CF$_2$—CF$_2$—O—CHF—CF$_2$—COO$^-$]$_i$X$^{i+}$; and

[CF$_3$—(O—CF$_2$)$_3$—O—CF$_2$—CF$_2$—O—CHF—CF$_2$—COO$^-$]$_i$X$^{i+}$, wherein X$^{i+}$ is as defined above. In other of these embodiments, the surfactant is selected from the group consisting of:

[CF$_3$—O—CF$_2$—CHF—COO$^-$]$_i$X$^{i+}$;

[C$_3$F$_7$—O—CF$_2$—CHF—COO$^-$]$_i$X$^{i+}$;

[CF$_3$—O—CF$_2$—CF$_2$—CF$_2$—O—CF$_2$—CHF—COO$^-$]$_i$X$^{i+}$;

[CF$_3$—O—CF$_2$—O—CF$_2$—CF$_2$—O—CF$_2$—CHF—COO$^-$]$_i$X$^{i+}$;

[CF$_3$—(O—CF$_2$)$_2$—O—CF$_2$—CF$_2$—O—CF$_2$—CHF—COO$^-$]$_i$X$^{i+}$; and

[CF$_3$—(O—CF$_2$)$_3$—O—CF$_2$—CF$_2$—O—CF$_2$—CHF—COO$^-$]$_i$X$^{i+}$, wherein X$^{i+}$ is as defined above. In other of these embodiments, the surfactant is selected from the group consisting of:

[CF$_3$—O—CF$_2$—CHF—CF$_2$—COO$^-$]$_i$X$^{i+}$;

[C$_2$F$_5$—O—CF$_2$—CHF—CF$_2$—COO$^-$]$_i$X$^{i+}$;

[C$_3$F$_7$—O—CF$_2$—CHF—CF$_2$—COO$^-$]$_i$X$^{i+}$;

[CF$_3$—O—CF$_2$—CF$_2$—CF$_2$—O—CF$_2$—CHF—CF$_2$—COO$^-$]$_i$X$^{i+}$;

[CF$_3$—O—CF$_2$—O—CF$_2$—CF$_2$—O—CF$_2$—CHF—CF$_2$—COO$^-$]$_i$X$^{i+}$;

[CF$_3$—(O—CF$_2$)$_2$—O—CF$_2$—CF$_2$—O—CF$_2$—CHF—CF$_2$—COO$^-$]$_i$X$^{i+}$; and

[CF$_3$—(O—CF$_2$)$_3$—O—CF$_2$—CF$_2$—O—CF$_2$—CHF—CF$_2$—COO$^-$]$_i$X$^{i+}$, wherein X$^{i+}$ is as defined above. In other of these embodiments, the surfactant is selected from the group consisting of:

[CF$_3$—O—CF$_2$CF$_2$—CF$_2$—O—CHF—COO$^-$]$_i$X$^{i+}$;

[CF$_3$—O—CF$_2$—CF$_2$—CF$_2$—O—CHF—CF$_2$—COO$^-$]$_i$X$^{i+}$;

[CF$_3$—O—CF$_2$—CF$_2$—CF$_2$—O—CF$_2$—CHF—COO$^-$]$_i$X$^{i+}$; and

[CF$_3$—O—CF$_2$—CF$_2$—CF$_2$—O—CF$_2$—CHF—CF$_2$—COO$^-$]$_i$X$^{i+}$, wherein X$^{i+}$ is as defined above.

In some embodiments, surfactants useful in practicing the present invention are represented by Formula II. In some of these embodiments, Q is F, m is 1, and R is alkylene. In some of these embodiments, the surfactant is selected from the group consisting of:

[CF$_3$—O—CHF—CF$_2$—O—CH$_2$—COO$^-$]$_i$X$^{i+}$;

[CF$_3$—O—CF$_2$—CF$_2$—CF$_2$—O—CHF—CF$_2$—O—CH$_2$—COO$^-$]$_i$X$^{i+}$;

[C$_3$F$_7$—O—CHF—CF$_2$—O—CH$_2$—COO$^-$]$_i$X$^{i+}$;

[C$_3$F$_7$—O—CHF—CF$_2$—O—CH$_2$—CH$_2$—COO$^-$]$_i$X$^{i+}$;

[C$_3$F$_7$—O—CF$_2$—CF$_2$—O—CHF—CF$_2$—OCH$_2$COO$^-$]$_i$X$^{i+}$; and

[C$_3$F$_7$—O—CF$_2$—CF$_2$—CF$_2$—O—CHF—CF$_2$—OCH$_2$COO$^-$]$_i$X$^{i+}$, wherein X$^{i+}$ is as defined above. In other of these embodiments, the surfactant is represented by formula [C$_3$F$_7$—O—CF$_2$—CHF—CF$_2$—OCH$_2$COO$^-$]$_i$X$^{i+}$, wherein X$^{i+}$ is as defined above. In other of these embodiments, the surfactant is selected from the group consisting of:

[CF$_3$—CHF—CF$_2$—O—CH$_2$COO$^-$]$_i$X$^{i+}$; and

[C$_3$F$_7$—CF$_2$—CHF—CF$_2$—OCH$_2$—COO$^-$]$_i$X$^{i+}$ wherein X$^{i+}$ is as defined above.

Surfactants useful in practicing the present invention can be readily prepared from known starting materials. For example, surfactants represented by a formula selected from the group consisting of:

[R$_f$—(O)$_t$—CHF—(CF$_2$)$_n$—COO$^-$]$_i$X$^{i+}$      I;

{[R$_f$—(O)$_t$—CQH—CF$_2$—O]$_m$—R—COO$^-$}$_i$X$^{i+}$      II; and

{[R$_f$—(O)$_t$—CQH—CF$_2$—O]$_m$—R—SO$_3^-$}$_i$X$^{i+}$      III can be prepared from fluorinated olefins of formula V:

wherein $R_f$ and t are as defined above. Numerous compounds of formula I are known (e.g., perfluorinated vinyl ethers and perfluorinated allyl ethers), and many can be obtained from commercial sources (e.g., 3M Company, St. Paul, Minn., and E.I. du Pont de Nemours and Company, Wilmington, Del.). Others can be prepared by known methods; (see, e.g., U.S. Pat. No. 5,350,497 (Hung et al.) and U.S. Pat. No. 6,255,536 (Worm et al.)).

Fluorinated carboxylic acids and their salts according to Formula I wherein n is 0 can be prepared, for example, by reacting a fluorinated olefin of Formula V with a base (e.g., ammonia, alkali metal hydroxides, and alkaline earth metal hydroxides). Alternatively, for example, a fluorinated olefin of Formula V can be reacted with an aliphatic alcohol (e.g., methanol, ethanol, n-butanol, and t-butanol) in an alkaline medium, and the resulting ether can be decomposed under acidic conditions to provide a fluorinated carboxylic acid of Formula I, wherein n is 0. Fluorinated carboxylic acids according to Formula I, wherein n is 1, can be prepared, for example, by a free radical reaction of the fluorinated olefin of Formula V with methanol followed by an oxidation of the resulting reaction product using conventional methods. Conditions for these reactions are described, for example, in U.S. Pat. App. No. 2007/0015864 (Hintzer et al.), the disclosure of which, relating to the preparation of compounds of Formula I, is incorporated herein by reference.

Fluorinated carboxylic acids and sulfonic acids and their salts of Formulas II and III can be prepared, for example, by reaction of a fluorinated olefin of Formula V with a hydroxyl compound of Formula VI to form a compound of Formula VII according to the reaction:

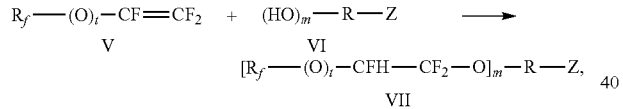

wherein $R_f$ and t are as defined above, m is 1, 2, or 3, R is alkylene or arylene, and Z represents a group selected from the group consisting of a carboxylic acid, a carboxylic acid salt, a carboxylic acid ester, a carboxamide, a sulfonic acid, a sulfonic acid salt, a sulfonic acid ester, and a sulfonamide. Compounds of Formula VI can be obtained, for example, from commercial sources or can be prepared by known methods. The reaction can be carried out, for example, under conditions described in U.S. Pat. App. No. 2007/0015864 (Hintzer et al.), the disclosure of which, relating to the preparation of compounds of Formula II and III, is incorporated herein by reference.

Typically, Z represents a carboxylic acid ester (e.g., an alkyl ester having from 1 to 4 carbon atoms in the alkyl group). Hydrolysis of an ester may be carried out, for example, under acidic or basic conditions and is generally carried out in an alcoholic acidic or basic solution of the intermediate compound. Alternatively the intermediate compound may be hydrolysed in an acidic or basic solution of other water miscible organic solvents (e.g., ketones and ethers). Typically, a basic alcoholic solution is used (e.g., a methanol or ethanol solution containing an alkali metal hydroxide). Typically, the hydrolysis is carried out at room temperature, but it is also possible to use elevated temperatures, for example, up to the boiling point of the solution.

Fluorinated carboxylic acids and their salts according to Formula IV can be prepared, for example, by decarbonylation of difunctional perfluorinated acid fluoride according to the reaction:

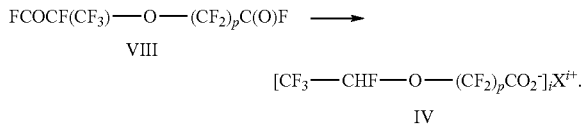

The reaction is typically carried out at an elevated temperature in the presence of water and base (e.g., a metal hydroxide or metal carbonate) according to known methods; see, e.g., U.S. Pat. No. 3,555,100 (Garth et al.), the disclosure of which, relating to the decarbonylation of difunctional acid fluorides, is incorporated herein by reference.

Compounds of Formula VIII are available, for example, from the coupling of perfluorinated diacid fluorides of Formula IX and hexafluoropropylene oxide according to the reaction:

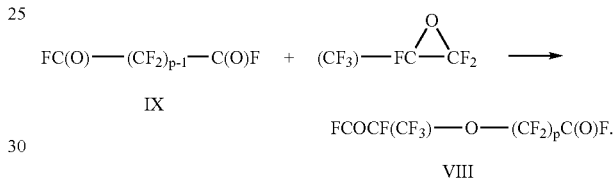

Compounds of Formula IX are available, for example, by electrochemical fluorination or direct fluorination of a difunctional ester of formula $CH_3OCO(CH_2)_{p-1}COOCH_3$ or a lactone of formula:

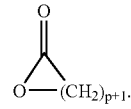

General procedures for carrying out electrochemical fluorination are described, for example, in U.S. Pat. No. 2,713,593 (Brice et al.) and International App. Pub. No. WO 98/50603. General procedures for carrying out direct fluorination are described, for example, in U.S. Pat. No. 5,488,142 (Fall et al.).

Fluorinated surfactants useful in practicing the present invention may be formulated into concentrates (e.g., in at least one of water or solvent), wherein the fluorinated surfactant is present in an amount of at least 10, 20, 30, or even at least 40 percent by weight, based on the total weight of the liquid fluorinated surfactant concentrate. Techniques for preparing concentrates are well known in the art.

In some embodiments, aqueous compositions according to the present invention comprise a non-fluorinated polymer and a surfactant. These compositions may be useful, for example, for coatings (e.g., floor finishes, varnishes, automotive coatings, marine coatings, sealers, hard coats for plastic lenses, coatings for metal cans or coils, and inks). When used in aqueous formulations, (e.g., for coatings), surfactants of Formula I, II, III, or IV can be formulated into an aqueous solution or dispersion at a final concentration, for example, of about 0.001 to about 1 weight percent (wt. %), about 0.001 to about 0.5 wt. %, or about 0.01 to about 0.3 wt. %, based on the weight of the solution or dispersion. Surfactants of Formula I, II, III, or IV typically enhance wetting and/or leveling of a coating (e.g., an aqueous coating) on a substrate surface and may provide better dispersability of a component (e.g., a thickening agent or pigment) within the coating formulation.

In some embodiments, aqueous compositions according to the present invention (e.g., for coatings) include at least one non-fluorinated polymer, typically a film-forming polymer. In some embodiments, articles according to the present invention have a surface wherein at least a portion of the surface is in contact with a non-fluorinated polymer. Examples of suitable non-fluorinated polymers include acrylic polymers, (e.g., poly(methyl methacrylate-co-ethyl acrylate) or poly (methyl acrylate-co-acrylic acid)); polyurethanes, (e.g., reaction products of aliphatic, cycloaliphatic or aromatic diisocyanates with polyester glycols or polyether glycols); polyolefins, (e.g., polystyrene); copolymers of styrene with acrylate(s) (e.g., poly(styrene-co-butyl acrylate); polyesters, (e.g, polyethylene terephthalate, polyethylene terephthalate isophthalate, or polycaprolactone); polyamides, (e.g., poly-hexamethylene adipamide); vinyl polymers, (e.g., poly(vinyl acetate/methyl acrylate), poly(vinylidene chloride/vinyl acetate); polydienes, (e.g., poly(butadiene/styrene)); cellulosic derivatives including cellulose ethers and cellulose esters, (e.g., ethyl cellulose, or cellulose acetate/butyrate), urethane-acrylate copolymers, and combinations thereof. Methods and materials for preparing aqueous emulsions or latexes of such polymers are well known, and many are widely available from commercial sources. In some embodiments, the non-fluorinated polymer is at least one of an acrylic polymer, a polyurethane, a polystyrene, or a styrene-acrylate copolymer.

In some embodiments, aqueous compositions according to the present invention comprising a non-fluorinated polymer and a surfactant of Formula I, II, III, or IV contain one or more cosolvents (e.g., coalescing solvents) including ethers of polyhydric alcohols (e.g., ethylene glycol monomethyl (or monoethyl)ether, diethylene glycol methyl (or ethyl)ether, triethylene glycol monomethyl (or monoethyl)ether, 2-butoxyethanol (i.e., butyl cellusolve), or di(propylene glycol) methyl ether (DPM)); alkylene glycols and polyalkylene glycols (e.g., ethylene glycol, propylene glycol, butylene glycol, triethylene glycol, hexylene glycol, diethylene glycol, polyethylene glycol, polypropylene glycol); and 2,2,4-trimethyl-1,3-pentanediol monoisobutyrate (an ester alcohol available, for example, from Eastman Chemical Company, Kingsport, Tenn., under the trade designation "TEXANOL"). Other water-miscible organic solvents that may be added to a formulation include alcohols having 1 to 4 carbon atoms (e.g., methanol, ethanol, isopropanol, or isobutanol); amides and lactams, (e.g., N,N-dimethylformamide, N,N-dimethylacetamide, or N-methylpyrrolidone); ketones and ketoalcohols (e.g., acetone, cyclohexanone, methyl isobutyl ketone, diacetone alcohol); ethers (e.g., tetrahydrofuran or dioxane); 1,3-dimethyl-2-imidazolidinone; and combinations thereof.

Depending on the application, aqueous compositions according to the present invention may also include at least one additive (e.g., biocides, fillers, additional leveling agents, emulsifiers, defoamers, anticorrosive agents, dispersants, and rust inhibitors). The aqueous composition may also optionally contain at least one pigment.

When an aqueous composition according to the present invention is applied to a surface (e.g., in coating applications), water and solvent typically evaporate, and the polymer particles coalesce to form a continuous film. Aqueous compositions according to the present invention can be applied to a surface, dried, and optionally heated, leaving the surface with a solid coating. The addition of fluorinated surfactants according to the present invention may improve the film forming properties of some formulations by improving the ability of the coating to wet the substrate and/or by allowing for even evaporation of the water (i.e., leveling) during film formation. Fluorinated surfactants according to the present invention may also impart corrosion-resistant properties to the final solid coating, which provides an additional benefit when the substrate is a metallic substrate (e.g., an electronic component).

Aqueous compositions according to the present invention comprising a non-fluorinated polymer and a surfactant include floor polishes and finishes, varnishes for a variety of substrates (e.g., wood floors), aqueous gels applied in the manufacture of photographic film, automotive or marine coatings (e.g., primers, base coats, or topcoats), sealers for porous substrates (e.g., wood, concrete, or natural stone), hard coats for plastic lenses, coatings for metallic substrates (e.g., cans, coils, electronic components, or signage), inks (e.g, for pens or gravure, screen, or thermal printing), and coatings used in the manufacture of electronic devices (e.g., photoresist inks) The aqueous compositions may be clear or pigmented.

Aqueous compositions according to the present invention comprising a non-fluorinated polymer and a surfactant may be useful as alkaline waterborne coating formulations, for example, amine-stabilized floor finish formulations.

Methods of coating a surface according to the present invention using an aqueous composition comprising a non-fluorinated polymer and a surfactant can be carried out using a variety of application methods known to one of skill in the art (e.g., brushing, mopping, bar coating, spraying, dip coating, gravure coating, and roll coating).

In some embodiments of methods of coating a surface according to the present invention or methods of cleaning a surface according to the present invention, the surface is a flooring surface comprising at least one of vinyl composition tiles, vinyl sheet flooring, linoleum, rubber sheeting, rubber tile, cork, synthetic sports flooring and vinyl asbestos tile, and non-resilient flooring substrates such as terrazzo, concrete, wood flooring, bamboo, wood laminate, engineered wood products (e.g., wood epoxy blends, permanently coated substrates such as those available from Pergo, Raleigh, N.C. under the trade designation "PERGO" and from DIAN, Gardena, Calif., under the trade designation "PARQUET BY DIAN"), stone, marble, slate, ceramic tile, grout, and dry shake flooring.

Methods of cleaning a surface according to the present invention comprise contacting the surface with an aqueous composition, the aqueous composition comprising a surfactant of Formula I, II, III, or IV. The surfactant may provide improved wetting of the surface and/or the contaminants to be removed. For methods of cleaning a surface according to the present invention, an aqueous composition is typically formulated to include about 0.001 to about 1 wt. %, or about 0.001 to about 0.5 wt. % surfactant (i.e., Formula I, II, III, or IV), based on the total weight of the aqueous composition. For hard-surface cleaning, an aqueous composition comprising a surfactant of Formula I, II, III, or IV is sprayed (e.g., from a spray bottle) or otherwise applied to a hard surface such as window glass, a mirror, or ceramic tile, and the surface is wiped clean with a paper or fabric wipe. The contaminated part may also be immersed or dipped into the aqueous composition. For methods of cleaning used in the manufacture of electronic materials, the aqueous composition is typically placed in a bath, and electronic parts are either dipped or run through the bath on a conveyor belt. In some embodiments, the surface that is cleaned comprises a flooring surface or a decking surface.

In any of the aforementioned embodiments of aqueous compositions according to and/or useful in practicing the present invention (e.g., coating or cleaning solution formulations) and any of the aforementioned embodiments of articles according to the present invention, surfactants of Formulas I, II, III, or IV can be used individually or in combination with a non-fluorinated surfactant (e.g., a hydrocarbon or silicone surfactant) to produce the desired surface tension reduction or wetting improvement. Useful auxiliary surfactants may be found, for example, in Industrial Applications Of Surfactants, D. R. Karsa, Ed., Royal Society of Chemistry, London, and M. Rosen, Surfactants and Interfacial Phenomena, Wiley-Interscience, New York.

In some embodiments, methods of cleaning a surface according to the present invention comprise removing a coating from the surface. In some embodiments, the surface comprises a flooring surface or a decking surface. In these embodiments, contacting the surface comprises contacting the coating with an aqueous composition comprising an aqueous composition comprising a surfactant of Formula I, II, III, or IV. In some embodiments, the coating is a floor finish, (e.g., an amine-stabilized acrylic that may include zinc). Although not wanting to be bound by theory, it is believed that zinc acts as a crosslinker for the carboxylate groups present in the acrylic to form a durable hard coating. Examples of floor finishes that may be removed using methods according to the present invention include acrylic finishes available, for example, from Ecolab Inc., St. Paul, Minn., under the trade designations "GEMSTAR LASER" and "TAJ MAHAL"; from Butchers, Sturtevant, Wis., under the trade designation "HIGH NOON"; from Buckeye International, Inc., Maryland Heights, Mo., under the trade designation "CITATION"; from S C Johnson, Racine, Wis., under the trade designations "COMPLETE", "SIGNATURE", "TECHNIQUE" and "VECTRA"; from Minuteman, International, Inc., Addison, Ill. under the trade designations "SPLENDOR", "DECADE 90", "PRIME SHINE", "ULTRA" and "PREMIER"; and from Spartan Chemical Co., Toledo, Ohio, under the trade designation "UPPER LIMITS", floor finishes available, for example, from 3M, St. Paul, Minn., under the trade designations "CORNERSTONE" and "TOPLINE", and urethane acrylate finishes available, for example, from Minuteman, International, Inc. under the trade designation "FORTRESS".

Typically, aqueous compositions according to the present invention useful, for example, for removing a coating from a surface (i.e., as a stripping composition) have a pH of at least 8 (in some embodiments, at least 9, 10, 11, 12, or 13) and, in some embodiments, comprise at least one solvent and a surfactant of Formula I, II, III, or IV. In some embodiments of aqueous compositions according to the present invention, the aqueous composition has a pH that is greater than 11. The high alkalinity in the stripping formulation may be due to the presence of caustic and/or monoethanolamine that may be added, for example, to break a metal cross link bond, allowing the stripper to dissolve the floor finish. Typical levels of monoethanolamine include 1 to 5% by weight, based on the total weight of the composition.

At least one solvent may be present in some embodiments of aqueous compositions according to the present invention at a typical level of 5 to 15% by weight, based on the total weight of the composition. Exemplary solvents include 2-butoxyethanol (available, for example, from Union Carbide Corporation, a wholly owned subsidiary of Dow Chemical Co., Midland, Mich., under the trade designation "BUTYL CEL-LOSOLVE"), acetamidophenol, acetanilide, acetophenone, 2-acetyl-1-methylpyrrole, benzyl acetate, benzyl alcohol, benzyl benzoate, benzyloxyethanol, ethylene glycol phenyl ether commercially available, for example, under the trade designation "DOWANOL EPH" from Dow Chemical Co., propylene glycol phenyl ether commercially available, for example, under the trade designation "DOWANOL PPH" from Dow Chemical Co., 2-(2-aminoethoxy)ethanol, amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diethylene glycol n-butyl ether, diisobutyl carbinol, diisobutyl ketone, dimethyl heptanol, dipropylene glycol n-butyl ether, dipropylene glycol methyl ether, dipropylene glycol propyl ether, dipropylene glycol tert-butyl ether, ethanol, ethyl acetate, 2-ethylhexanol, ethyl propionate, ethylene glycol butyl ether, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol n-butyl ether, propylene glycol ethyl ether, propylene glycol methyl ether, propylene glycol n-propyl ether, tripropylene glycol methyl ether, tripropylene glycol n-butyl ether, and solvents commercially available, for example, from Union Carbide Corp. under the trade designations "BUTOXYETHYL PROPASOL", "BUTYL CARBITOL ACETATE", "BUTYL CARBITOL", "BUTYL CELLOSOLVE ACETATE", "BUTYL DIPROPASOL", "BUTYL PROPASOL", "CARBITOL PM-600", "CARBITOL LOW GRAVITY", "CELLOSOLVE ACETATE", "ESTER EEP", "FILMER IBT", "HEXYL CARBITOL", "HEXYL CELLOSOLVE", "METHYL CARBITOL", "METHYL CELLOSOLVE ACETATE", "METHYL CELLOSOLVE", "METHYL DIPROPASOL", "METHYL PROPASOL ACETATE", "METHYL PROPASOL", "PROPYL CARBITOL", "PROPYL CELLOSOLVE", "PROPYL DIPROPASOL", and "PROPYL PROPASOL".

In some embodiments, other components of aqueous compositions (e.g., stripping compositions) according to the present invention include at least one of sodium hydroxide, silicates, or alkali salts, each of which may be present, for example, at 1 to 5% by weight based on the total weight of the composition. In some embodiments, aqueous compositions (e.g., stripping compositions) of the present invention and/or useful in practicing the present invention include non-fluorinated surfactants, typically at levels of 0.1 to 1% by weight, based on the total weight of the composition. Useful non-fluorinated surfactants include potassium alkyl alkoxy alkanolate (available, for example, from Mona Industries, Patterson, N.J., under the trade designation "MONA NF10") and a surfactant available, for example, from Dow Corning, Midland, Mich. under the trade designation "TERGITOL MINFOAM 1X". Generally, it is desired that surfactants be low foaming due to the need to vacuum the stripper from the floor.

An aqueous composition (e.g., a stripping composition) according to and/or useful in practicing the present invention may also contain a variety of adjuvants such as defoamers, couplers (e.g., sodium xylenesulfonate and sodium octane sulfonate), thickeners, perfumes, and colorants. A thickener such as magnesium aluminum silicate, sold by R.T. Vanderbilt Co., Norwalk, Conn., under the trade designation "VEE-GUM T" is a suitable thickening agent that may be used at 0.3 to about 0.6% by weight, based on the total weight of the composition. Other representative commercially available water thickeners include xanthan gums (e.g., available from CP Kelco, Houston, Tex., under the trade designation "KELZAN" and from R. T. Vanderbilt Co. under the trade designation "VANZAN"); diutan gums (e.g., available from CP Kelco under the trade designation "GEOVIS XT"); gellan gums (e.g., available from CP Kelco under the trade designation "KELCOGEL"); carrageenan gums (e.g., available from CP Kelco under the trade designation "GENUVISCO X-906-02") and hydrocolloids (e.g., available from Noveon, Inc. under the trade designation "NOVEGUM C865").

Methods of removing a coating from a surface can be carried out using methods known in the art. For example, aqueous compositions according to the present invention (e.g., stripping compositions) may be applied with a mop and the finish removed with a floor machine and collected with a vacuum cleaner. Alternately the finish may be a mop on, mop off type. Some floor finishes, for example, urethane based finishes, may require that the stripping composition contact the finish for longer times than required for acrylic floor finishes.

Embodiments of this invention are further illustrated by the following non-limiting examples, but the particular materials and amounts thereof recited in these examples, as well as other conditions and, details, should not be construed to unduly limit this invention.

EXAMPLES

Preparation 1: $CF_3O(CF_2)_3OCHFCF_2COOK$ $CF_3O(CF_2)_3OCHFCF_2COOCH_3$ (19.6 grams, 50.0 mmol), 15 grams of ethanol, 2.8 grams (50 mmol) of potassium hydroxide, and 2 grams of water were added to a 100-mL, 3-necked flask, equipped with a stirrer, a condenser, and a thermometer. The reaction mixture was heated on a heating mantle and stirred for 6 hours at 40° C. A clear, colorless solution of $CF_3O(CF_2)_3OCHFCF_2COOK$ was obtained.

The solution from was diluted with water to a concentration of 1000 ppm.

The starting compound $CF_3O(CF_2)_3OCHFCF_2COOCH_3$ was prepared according to the method described in the synthesis of compound 2 in U.S. Pat. App. No. US2007/0142541 (Hintzer et al.); the disclosure of this synthesis is incorporated herein by reference.

Preparation 2: $C_3F_7OCHFCF_2COOK$

The procedure of Preparation 1 was followed except using 16.3 grams of $C_3F_7OCHFCF_2COOCH_3$ instead of the $CF_3O(CF_2)_3OCHFCF_2COOCH_3$ to prepare a solution of $C_3F_7OCHFCF_2COOK$. This solution was diluted with water to a concentration of 1000 ppm.

The starting compound $C_3F_7OCHFCF_2COOCH_3$ was prepared according to the method described in the synthesis of compound 4 in U.S. Pat. App. No. US2007/0142541 (Hintzer et al.); the disclosure of this synthesis is incorporated herein by reference.

Preparation 3: $CF_3O(CF_2)_3OCHFCF_2COONa$

The procedure of Preparation 1 was followed except using 2 grams of sodium hydroxide (50 mmol) instead of potassium hydroxide.

Preparation 4: $C_3F_7OCHFCF_2COONa$

The procedure of Preparation 1 was followed except using 16.3 grams of $C_3F_7OCHFCF_2COOCH_3$ instead of the $CF_3O(CF_2)_3OCHFCF_2COOCH_3$ and using 2 grams of sodium hydroxide (50 mmol) instead of potassium hydroxide.

Preparation 5: $CF_3O(CF_2)_3OCHFCF_2COONH_4$

The procedure of Preparation 1 was followed except using 7 grams (50 mmol) of a 25% by weight ammonium hydroxide solution in water instead of potassium hydroxide.

Preparation 6: $C_3F_7OCHFCF_2COONH_4$

The procedure of Preparation 1 was followed except using 16.3 grams of $C_3F_7OCHFCF_2COOCH_3$ instead of the $CF_3O(CF_2)_3OCHFCF_2COOCH_3$ and using 7 grams (50 mmol) of a 25% by weight ammonium hydroxide solution in water instead of potassium hydroxide.

Static surface tensions were measured on the solutions of Preparations 1 to 6 using a Kruss K-12 tensiometer (obtained from Kruss GmbH, Hamburg, Germany) using the Du Nouy ring method at 20° C. The results are shown in Table 1, below.

TABLE 1

| Preparation | Surface Tension (mN/m) |
| --- | --- |
| 1 | 56.0 |
| 2 | 62.6 |
| 3 | 56.7 |
| 4 | 62.4 |
| 5 | 54.8 |
| 6 | 58.3 |

For comparison, the surface tension was measured on a solution of 1000 ppm of potassium perfluorohexanoate in water and was found to be 58.5 mN/m.

Examples 1 and 2

A mixture of 10% by weight 2-butoxyethanol, 3% by weight sodium metasilicate, 3% by weight monoethanolamine, and 1% by weight sodium hydroxide in water was prepared. The surfactant of Preparation 1 was added at 100 ppm to this composition to provide Example 1, and 500 ppm of the surfactant of Preparation 1 was added to this composition to provide Example 2. The surface tensions were measured for Examples 1 and 2 according to the method described above. The results are shown in Table 2, below.

TABLE 2

| Example | Concentration of surfactant | Surface Tension (mN/m) |
| --- | --- | --- |
| 1 | 100 ppm | 24.8 |
| 2 | 500 ppm | 24.3 |

Examples 3 and 4

A mixture of 10% by weight 2-butoxyethanol, 3% by weight sodium metasilicate, 3% by weight monoethanolamine, and 1% by weight sodium hydroxide in water was prepared. The surfactant of Preparation 2 was added at 100 ppm to this composition to provide Example 3, and 500 ppm of the surfactant of Preparation 2 was added to this composition to provide Example 4. The surface tensions were measured for Examples 3 and 4 according to the method described above. The results are shown in Table 3, below.

TABLE 3

| Example | Concentration of surfactant | Surface Tension (mN/m) |
|---|---|---|
| 3 | 100 ppm | 25.2 |
| 4 | 500 ppm | 24.7 |

Example 5

An aqueous acrylic floor polish was obtained from Sutter Professional, Italy. The floor polish had been specially formulated to contain no fluorinated surfactant. The surfactant of Preparation 1 was added to the floor polish at 200 ppm. The surface tension of the polish was then measured according to the method described above and found to be 30.2 mN/m. About five mL of the floor polish, containing 200 ppm of the surfactant of Preparation 1, was applied to the center of a 12 inch×12 inch (30.48 cm×30.48 cm) polyvinylchloride (PVC) sheet and then spread with a piece of gauze to evenly cover the entire surface area of the PVC sheet. The PVC sheet with the floor polish coating was then allowed to dry for 24 hours at room temperature. The PVC sheet was visually inspected and found to have a smooth coating over its surface with no craters.

For the purposes of comparison, the procedure of Example 5 was carried out using the floor polish formulation without any added fluorinated surfactant. The surface tension of the floor polish formulation was measured using the method described above and found to by 31.6 mN/m. After the floor polish was applied to a PVC sheet and allowed to dry for 24 hours, the PVC sheet was visually inspected. The coating on the surface of the PVC sheet contained craters.

Various modifications and alterations of this invention may be made by those skilled in the art without departing from the scope and spirit of this invention, and it should be understood that this invention is not to be unduly limited to the illustrative embodiments set forth herein.

What is claimed is:

1. An aqueous composition comprising a non-fluorinated polymer and a surfactant, wherein the surfactant is represented by a formula selected from the group consisting of:

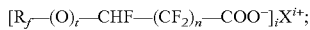

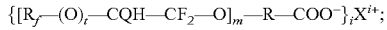

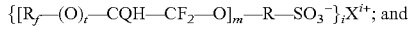

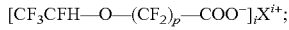

wherein
$R_f$ represents a partially or fully fluorinated aliphatic group optionally interrupted with at least one oxygen atom;
Q is selected from the group consisting of F and $CF_3$;
R is selected from the group consisting of alkylene and arylene;
$X^{i+}$ represents a cation having a valence i, wherein i is 1, 2 or 3;
t is 0 or 1, wherein when the surfactant is represented by formula $[R_f-(O)_t-CHF-(CF_2)_n-COO^-]_i X^{i+}$ and t is 0, then $R_f$ is interrupted with at least one oxygen atom;
m is 1, 2, or 3;
n is 0 or 1; and
p is an integer from 1 to 6; and wherein the aqueous composition is essentially free of fluoropolymers.

2. The aqueous composition according to claim 1, wherein the non-fluorinated polymer is at least one of an acrylic polymer, a polyurethane, a polyolefin, a styrene-acrylate copolymer, a polyester, a polyamide, a vinyl polymer, a polydiene, or a cellulosic polymer.

3. The aqueous composition according to claim 2, wherein the non-fluorinated polymer is at least one of an acrylic polymer, a polyurethane, a polystyrene, or a styrene-acrylate copolymer.

4. The aqueous composition according to claim 1, further comprising a coalescing solvent.

5. The aqueous composition according to claim 1, wherein t is 1, and wherein $R_f$ is selected from the group consisting of:
fully fluorinated aliphatic groups having from 1 to 6 carbon atoms; and
fully fluorinated groups represented by formula:

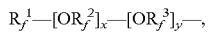

wherein
$R_f^1$ is a perfluorinated aliphatic group having from 1 to 6 carbon atoms;
$R_f^2$ and $R_f^3$ are each independently perfluorinated alkylene having from 1 to 4 carbon atoms; and
x and y are each independently an integer having a value from 0 to 4, wherein the sum of x and y is at least 1.

6. The aqueous composition according to claim 1, wherein t is 0, and wherein $R_f$ is a fully fluorinated group represented by formula:

wherein
$R_f^4$ is a perfluorinated aliphatic group having from 1 to 6 carbon atoms;
$R_f^5$ and $R_f^6$ are each independently perfluorinated alkylene having from 1 to 4 carbon atoms; and
a and b are each independently integers having a value from 0 to 4.

7. The aqueous composition according to claim 1, wherein the surfactant is represented by formula:

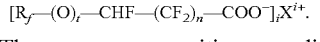

8. The aqueous composition according to claim 7, wherein n is 0.

9. The aqueous composition according to claim 8, wherein the surfactant is selected from the group consisting of:

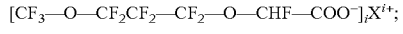

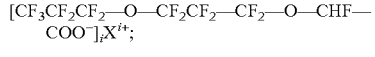

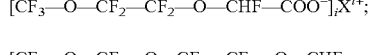

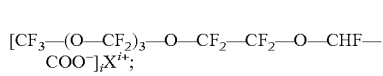

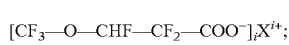

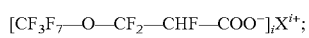

$[CF_3-O-CF_2-CF_2-O-CHF-CF_2-COO^-]_iX^{i+}$;

$[CF_3-O-CF_2-CF_2-CF_2-O-CHF-CF_2-COO^-]_iX^{i+}$;

$[CF_3-(O-CF_2)_2-O-CF_2-CF_2-O-CHF-CF_2-COO^-]_iX^{i+}$; and $[CF_3-(O-CF_2)_3-O-CF_2-CF_2-O-CHF-CF_2-COO^-]_iX^{i+}$.

10. The aqueous composition according to claim 1, wherein the surfactant is represented by formula:

$\{[R_f-(O)_t-CQH-CF_2-O]_m-R-COO^-\}_iX^{i+}$;

wherein Q is F, m is 1, and wherein R is alkylene.

11. The aqueous composition according to claim 1, wherein the surfactant is represented by formula:

$[CF_3CFH-O-(CF_2)_p-COO^-]_iX^{i+}$.

12. The aqueous composition according to claim 1, wherein the surfactant is selected from the group consisting of:

$[C_3F_7-O-CHF-COO^-]_iX^{i+}$;

$[CF_3-O-CF_2CF_2-CF_2-O-CHF-COO^-]_iX^{i+}$;

$[CF_3CF_2CF_2-O-CF_2CF_2-CF_2-O-CHF-COO^-]_iX^{i+}$;

$[CF_3-O-CF_2-CF_2-O-CHF-COO^-]_iX^{i+}$;

$[CF_3-O-CF_2-O-CF_2-CF_2-O-CHF-COO^-]_iX^{i+}$;

$[CF_3-(O-CF_2)_2-O-CF_2-CF_2-O-CHF-COO^-]_iX^{i+}$;

$[CF_3-(O-CF_2)_3-O-CF_2-CF_2-O-CHF-COO^-]_iX^{i+}$;

$[CF_3-O-CHF-CF_2-COO^-]_iX^{i+}$;

$[CF_3-O-CF_2-CF_2-O-CHF-CF_2-COO^-]_iX^{i+}$;

$[CF_3-CF_2-O-CHF-CF_2-COO^-]_iX^{i+}$;

$[CF_3-O-CF_2-CF_2-CF_2-O-CHF-CF_2-COO^-]_iX^{i+}$;

$[CF_3-O-CF_2-O-CF_2-CF_2-O-CHF-CF_2-COO^-]_iX^{i+}$;

$[CF_3-(O-CF_2)_2-O-CF_2-CF_2-O-CHF-CF_2-COO^-]_iX^{i+}$;

$[CF_3-(O-CF_2)_3-O-CF_2-CF_2-O-CHF-CF_2-COO^-]_iX^{i+}$;

$[CF_3-O-CF_2-CHF-COO^-]_iX^{i+}$;

$[C_3F_7-O-CF_2-CHF-COO^-]_iX^{i+}$;

$[CF_3-O-CF_2-CF_2-CF_2-O-CF_2-CHF-COO^-]_iX^{i+}$;

$[CF_3-O-CF_2-O-CF_2-CF_2-O-CF_2-CHF-COO^-]_iX^{i+}$;

$[CF_3-(O-CF_2)_2-O-CF_2-CF_2-O-CF_2-CHF-COO^-]_iX^{i+}$;

$[CF_3-(O-CF_2)_3-O-CF_2-CF_2-O-CF_2-CHF-COO^-]_iX^{i+}$;

$[CF_3-O-CF_2-CHF-CF_2-COO^-]_iX^{i+}$;

$[C_2F_5-O-CF_2-CHF-CF_2-COO^-]_iX^{i+}$;

$[C_3F_7-O-CF_2-CHF-CF_2-COO^-]_iX^{i+}$;

$[CF_3-O-CF_2-CF_2-CF_2-O-CF_2-CHF-CF_2-COO^-]_iX^{i+}$;

$[CF_3-O-CF_2-O-CF_2-CF_2-O-CF_2-CHF-CF_2-COO^-]_iX^{i+}$;

$[CF_3-(O-CF_2)_2-O-CF_2-CF_2-O-CF_2-CHF-CF_2-COO^-]_iX^{i+}$; and $[CF_3-(O-CF_2)_3-O-CF_2-CF_2-O-CF_2-CHF-CF_2-COO^-]_iX^{i+}$.

13. The aqueous composition according to claim 1, wherein the surfactant is selected from the group consisting of:

$[CF_3-O-CHF-CF_2-O-CH_2-COO^-]_iX^{i+}$;

$[CF_3-O-CF_2-CF_2-CF_2-O-CHF-CF_2-O-CH_2-COO^-]_iX^{i+}$;

$[C_3F_7-O-CHF-CF_2-O-CH_2-COO^-]_iX^{i+}$;

$[C_3F_7-O-CHF-CF_2-O-CH_2-CH_2-COO^-]_iX^{i+}$;

$[C_3F_7-O-CF_2-CF_2-O-CHF-CF_2-OCH_2COO^-]_iX^{i+}$;

$[C_3F_7-O-CF_2-CF_2-CF_2-O-CHF-CF_2-OCH_2COO^-]_iX^{i+}$;

$[C_3F_7-O-CF_2-CHF-CF_2-OCH_2COO^-]_iX^{i+}$;

$[CF_3-CHF-CF_2-O-CH_2COO^-]_iX^{i+}$; and $[C_3F_7-CF_2-CHF-CF_2-OCH_2-COO^-]_iX^{i+}$.

14. A method of coating a surface, the method comprising applying to the surface an aqueous composition according to claim 1.

* * * * *